(12) United States Patent
Adamchuk et al.

(10) Patent No.: US 10,104,827 B2
(45) Date of Patent: Oct. 23, 2018

(54) GUIDANCE SYSTEM AND STEERING CONTROL DEVICE FOR AN AGRICULTURAL VEHICLE

(71) Applicant: THE ROYAL INSTITUTION FOR THE ADVANCEMENT OF LEARNING/MCGILL UNIVERSITY, Montreal (CA)

(72) Inventors: Viacheslav Adamchuk, Ste-Anne-de-Bellevue (CA); Antoine Pouliot, Ste-Anne-de-Bellevue (CA); Trevor Stanhope, L'Île-Perrot (CA)

(73) Assignee: THE ROYAL INSTITUTION FOR THE ADVANCEMENT OF LEARNING/MCGILL UNIVERSITY, Montréal (CA)

( * ) Notice: Subject to any disclaimer, the term of this patent is extended or adjusted under 35 U.S.C. 154(b) by 292 days.

(21) Appl. No.: 15/205,429

(22) Filed: Jul. 8, 2016

(65) Prior Publication Data
US 2017/0006759 A1    Jan. 12, 2017

Related U.S. Application Data

(60) Provisional application No. 62/189,945, filed on Jul. 8, 2015.

(51) Int. Cl.
*A01B 69/00* (2006.01)
*G05D 1/02* (2006.01)
(Continued)

(52) U.S. Cl.
CPC .......... *A01B 69/001* (2013.01); *A01B 69/008* (2013.01); *B62D 1/00* (2013.01);
(Continued)

(58) Field of Classification Search
CPC .......... A01B 69/00; A01B 69/04; G06G 7/78; G06F 19/00; G05D 1/02; B62D 5/04
(Continued)

(56) References Cited

U.S. PATENT DOCUMENTS 3,807,252 A    4/1974  Parr
4,967,362 A   10/1990  Schutten et al.
(Continued)

FOREIGN PATENT DOCUMENTS

CN    201070967    6/2008
CN    201571344    9/2010
(Continued)

*Primary Examiner* — Thomas G Black
*Assistant Examiner* — Wae L Louie
(74) *Attorney, Agent, or Firm* — Norton Rose Fulbright Canada LLP (57) ABSTRACT

A vehicle guidance system for an agricultural vehicle is described which includes an optical imaging device collecting information of field characteristics, and a steering control device receiving the information of field characteristics transmitted from the optical imaging device. The steering control device having a steering actuator including a motor operatively connected to a hub adaptor. The hub adaptor is removably mountable to a central hub of a steering wheel of the agricultural vehicle in fixed rotary engagement, wherein when the hub adaptor is engaged to the central hub of the steering wheel, rotation of the hub adaptor by the motor causes corresponding rotation of the steering wheel. The steering control device thereby autonomously rotates the central hub of the steering wheel in response to the information of field characteristics received by the steering control device and the vehicle guidance system thereby steers the agricultural vehicle.

29 Claims, 5 Drawing Sheets

(51) Int. Cl.
*B62D 5/04* (2006.01)
*B62D 15/02* (2006.01)
*A01B 69/04* (2006.01)
*B62D 1/00* (2006.01)

(52) U.S. Cl.
CPC ......... *B62D 5/0463* (2013.01); *B62D 15/025* (2013.01); *G05D 1/0246* (2013.01); *G05D 2201/0201* (2013.01)

(58) Field of Classification Search
USPC .......... 701/23, 25, 28, 41, 50, 470; 180/169, 180/400, 444
See application file for complete search history.

(56) References Cited

U.S. PATENT DOCUMENTS

| | | | |
|---|---|---|---|
| 5,234,070 A | 8/1993 | Noah et al. | |
| 5,307,611 A | 5/1994 | Vardeman et al. | |
| 6,278,918 B1 | 8/2001 | Dickson et al. | |
| 6,285,930 B1 | 9/2001 | Dickson et al. | |
| 6,385,515 B1 | 5/2002 | Dickson et al. | |
| 6,445,983 B1 | 9/2002 | Dickson et al. | |
| 6,490,539 B1 | 12/2002 | Dickson et al. | |
| 6,686,951 B1 | 2/2004 | Dickson et al. | |
| 6,876,920 B1 | 4/2005 | Mailler | |
| 7,263,422 B2* | 8/2007 | Lange | B62D 1/00 172/2 |
| 7,349,779 B2* | 3/2008 | Nelson | B62D 1/02 701/41 |
| 8,019,839 B2* | 9/2011 | Lopes | G06F 9/44505 709/221 |
| 8,230,964 B2 | 7/2012 | Markfort | |
| 8,365,634 B2 | 2/2013 | Farwell et al. | |
| 8,565,978 B2* | 10/2013 | Elkins | A01B 69/008 701/41 |
| 8,725,361 B2* | 5/2014 | Kellum | A01B 69/008 56/10.2 F |
| 8,781,685 B2* | 7/2014 | McClure | B62D 5/046 342/357.52 |
| 8,839,903 B2* | 9/2014 | Markfort | B62D 1/10 180/443 |
| 9,751,402 B2* | 9/2017 | Fama | B60K 17/043 |
| 2002/0072850 A1 | 6/2002 | McClure et al. | |
| 2003/0187577 A1 | 10/2003 | McClure et al. | |
| 2003/0208311 A1 | 11/2003 | McClure et al. | |
| 2006/0142936 A1 | 6/2006 | Dix | |
| 2009/0204281 A1 | 8/2009 | McClure et al. | |
| 2011/0061963 A1 | 3/2011 | Farwell et al. | |
| 2011/0088963 A1 | 4/2011 | Markfort | |
| 2011/0118926 A1 | 5/2011 | Peake et al. | |
| 2013/0191017 A1 | 7/2013 | Peake et al. | |
| 2014/0025260 A1* | 1/2014 | McClure | B62D 5/046 701/41 |
| 2017/0006759 A1* | 1/2017 | Adamchuk | A01B 69/001 |

FOREIGN PATENT DOCUMENTS

| | | |
|---|---|---|
| CN | 202085463 | 12/2011 |
| CN | 202251547 | 5/2012 |
| CN | 102511238 | 11/2013 |
| JP | 2004058974 | 2/2004 |
| WO | 2006019462 | 2/2006 |
| WO | 2006019463 | 2/2006 |
| WO | 2006019540 | 2/2006 |

* cited by examiner

GUIDANCE SYSTEM AND STEERING CONTROL DEVICE FOR AN AGRICULTURAL VEHICLE

CROSS-REFERENCE TO RELATED APPLICATIONS

The application claims priority benefit to U.S. Patent Application No. 62/189,945 filed Jul. 8, 2015, the entire contents of which is incorporated herein by reference.

TECHNICAL FIELD

The present disclosure relates generally to agricultural vehicles, and more particularly to vehicle guidance systems for agricultural vehicles.

BACKGROUND

Agricultural vehicles can be equipped with instrumentation such as global navigation satellite system (GNSS) receivers and LIDAR systems (i.e. measuring distance by illuminating a target with a laser and analyzing the reflected light) to assist operators in guiding agricultural implements.

Such systems are commercially available but can be expensive, complicated to install on agricultural vehicles, and are sometimes incompatible with all makes and models of agricultural vehicles.

SUMMARY OF THE INVENTION

There is therefore provided a vehicle guidance system for an agricultural vehicle, comprising: an optical imaging device adapted to be mounted to the agricultural vehicle, the optical imaging device collecting information of field characteristics; and a steering control device in electrical communication with the optical imaging device and receiving the information of field characteristics transmitted from the optical imaging device, the steering control device having a steering actuator including a motor operatively connected to a hub adaptor, the hub adapter and the motor being coaxially engaged to define therethrough a common axis forming an axis of rotation of the hub adapter when driven by the motor, the hub adaptor being removably mountable to a central hub of a steering wheel of the agricultural vehicle in fixed rotary engagement, wherein when the hub adaptor is engaged to the central hub of the steering wheel, rotation of the hub adaptor by the motor about said axis of rotation causes corresponding rotation of the steering wheel about a steering wheel axis that is coaxial with the axis of rotation of the motor and the hub adapter, the steering control device thereby autonomously rotating the central hub of the steering wheel in response to the information of field characteristics received by the steering control device from the optical imaging device, the vehicle guidance system thereby steering the agricultural vehicle.

There is also provided a steering control device for a vehicle guidance system of an agricultural vehicle, the steering control device comprising a steering actuator including a motor operatively connected to a hub adaptor, the hub adapter rotated by the motor about an axis of rotation and the hub adapter being removably mountable to a central hub of a steering wheel of the agricultural vehicle with the axis of rotation coaxial with a steering wheel axis of the steering wheel, the hub adapter having a generally cylindrical body with a base at a first end rotatably fixed to an output shaft of the motor and a number of spoke-engaging elements at an opposed second end of the hub adapter, the spoke-engaging elements being circumferentially spaced apart about the body of the hub adapter and circumscribing a central opening in the second end of the body which is adapted to receive therein at least a portion of the central hub of the steering wheel.

There is further provided a method for guiding an agricultural vehicle, comprising: obtaining visual information of field characteristics in a direction of travel of the agricultural vehicle; providing the visual information of field characteristics to a steering unit having an actuator mounted directly to the central hub of a steering wheel of the agricultural vehicle; and using the actuator to rotate the central hub, and therefore the steering wheel, in response to the visual information of field characteristics, thereby steering the agricultural vehicle along the direction of travel.

In an alternate aspect, there is provided an agricultural vehicle guidance system, comprising: a video camera collecting information of field characteristics in a direction of travel of the agricultural vehicle; a steering unit receiving the information of field characteristics from the video camera, the steering unit having a hub adapter removably mounted to a central hub of a steering wheel of the agricultural vehicle and a motor driving the central hub of the steering wheel and autonomously rotating the central hub in response to the information of field characteristics, thereby steering the agricultural vehicle along the direction of travel.

In another alternate aspect, there is provided a method for guiding an agricultural vehicle, comprising: obtaining visual information of field characteristics in a direction of travel of the agricultural vehicle; and rotating a central hub of a steering wheel of the agricultural vehicle in response to the visual information of field characteristics, thereby steering the agricultural vehicle along the direction of travel.

In a further alternate aspect, there is provided a steering unit of an agricultural vehicle, comprising: an adjustable arm having a first end fixed to the agricultural vehicle and a second end fixed to a motor, the motor driving a hub adapter removably mounted to a central hub of a steering wheel of the agricultural vehicle, the motor in operation autonomously rotating the central hub about a steering wheel axis in response to visual information of field characteristics, thereby rotating the central hub and steering the agricultural vehicle along a direction of travel.

BRIEF DESCRIPTION OF THE DRAWINGS

Reference is now made to the accompanying figures in which.

DETAILED DESCRIPTION

Figure 1A:
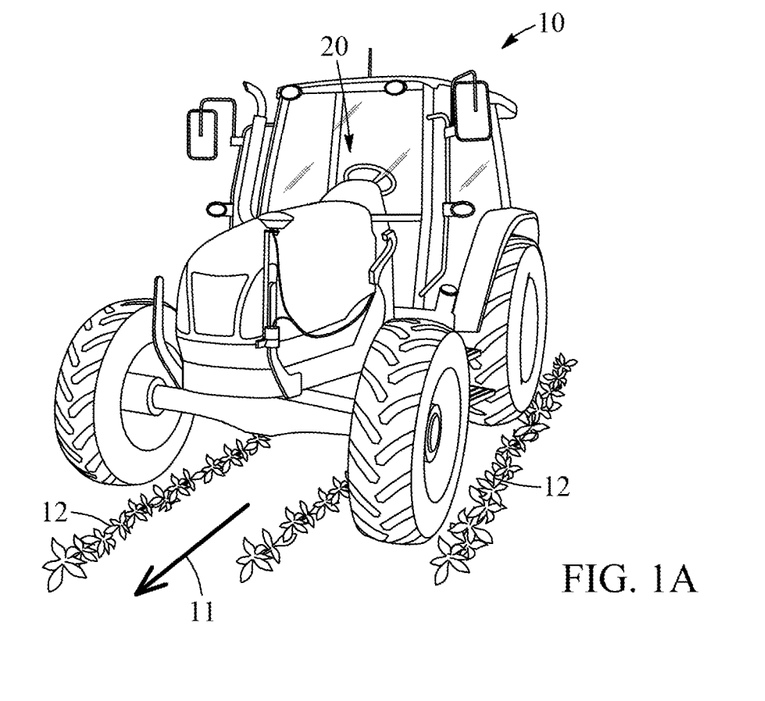
FIG. 1A is a front perspective view of an agricultural vehicle travelling through rows of crops.
Figure 1B:
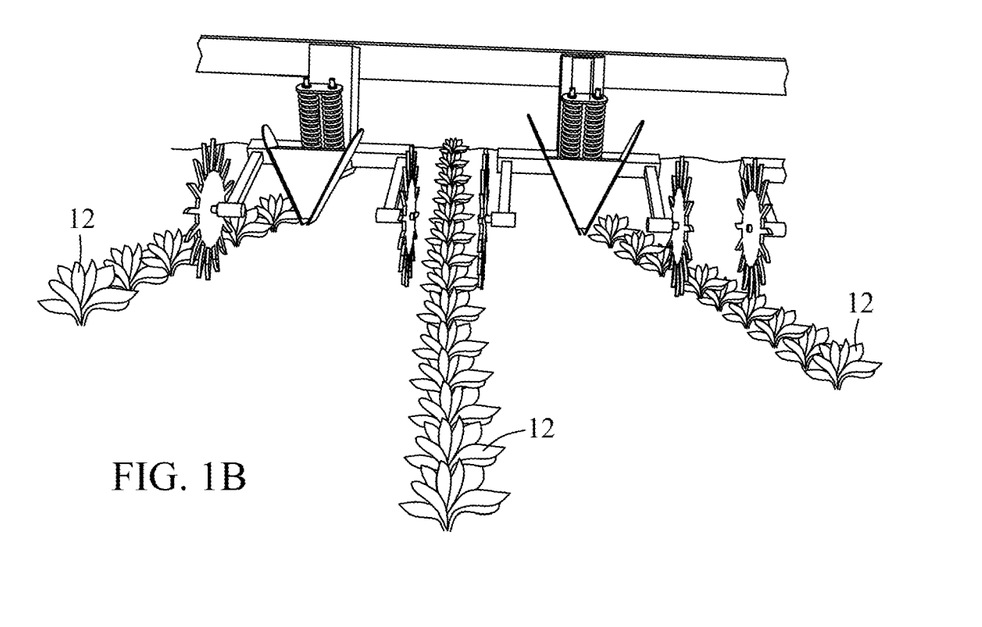
FIG. 1B is rear perspective view of the agricultural vehicle of FIG. 1A travelling through the rows of crops.

FIGS. 1A and 1B illustrate an agricultural vehicle 10 moving along a direction of travel 11. The agricultural vehicle 10 (or simply "vehicle 10") shown is a cultivator, which may be used for example for cultivation and fertilization of crops 12 during the early stages of row crop development. Other types of agricultural vehicles 10 are also within the scope of the present disclosure.

Regardless of the type of agricultural vehicle 10, a vehicle guidance system 20 for use therewith is described herein which is operable to guide and/or direct movement of the vehicle 10. This may be done, for example, based on external factors detected by the vehicle guidance system 20 that are specific to agricultural applications, as will be seen.

The present agricultural vehicle guidance system 20 is therefore provided to steer, in a substantially automated and autonomous manner (i.e. substantially without direct human operator intervention), the agricultural vehicle 10. This may for example be along a desired direction of travel 11. The agricultural vehicle guidance system 20 (or simply "guidance system 20") allows for substantially autonomous (or in some cases semi-autonomous) directional control of the vehicle 10 as it performs agricultural functions (e.g. row crop cultivation, harvesting, etc.). The guidance system 20 therefore reduces or eliminates entirely the need for a human operator to steer the vehicle 10 when it is being used. The guidance system 20 can therefore be used to assist the human operator when using the vehicle 10, so as to allow the human operator to rest, or can serve as a redundancy measure to correct the course of the vehicle 10 when the human operator causes it to deviate. It can thus be appreciated that the guidance system 20 allows for the vehicle 10 to perform its agricultural functions for greater durations or during periods of the day which would be inconvenient for the human operator. In so doing, the guidance system 20 helps to increase the productivity of the vehicle 10.

Figure 2:
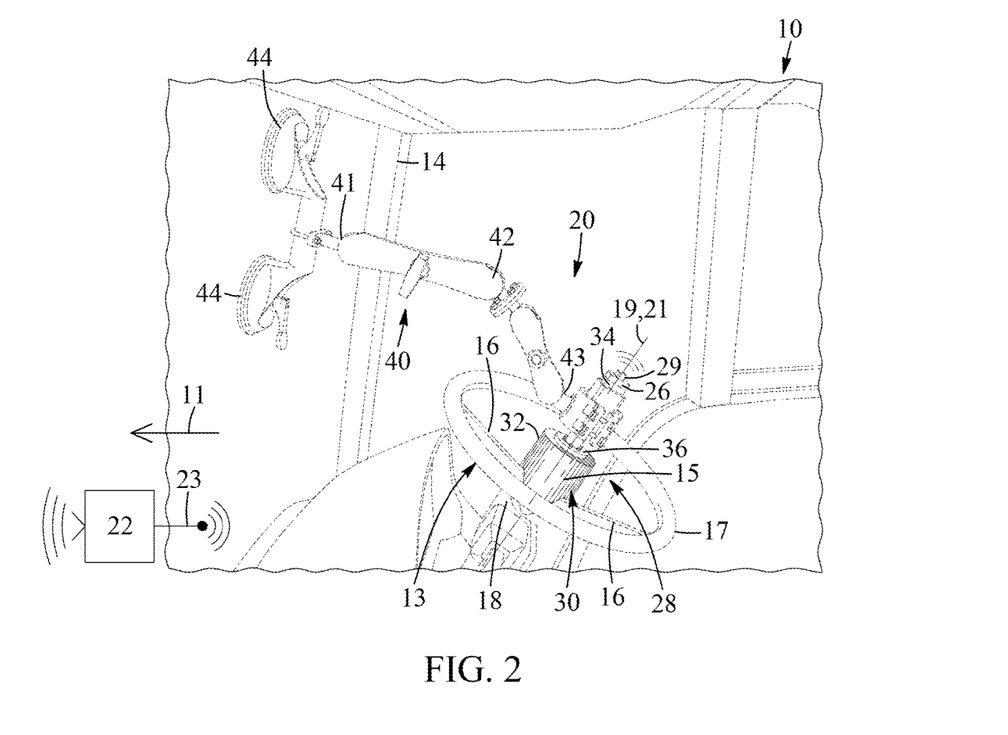
FIG. 2 is a schematic view of an agricultural vehicle guidance system, according to an embodiment of the present disclosure.

Referring to FIG. 2, the vehicle guidance system 20 includes generally an optical imaging device 22, which collects imaging information and/or other data relating to field characteristics as the agricultural vehicle 10 moves along the direction of travel 11, and a steering control device 28, which has a receiver 29 in electrical communication with a transmitter 23 of the optical imaging device 22. The steering control device 28 is therefore in communication with the optical imaging device 22, via the transmitter 23 and receiver 29, to receive the collected imaging information from the optical imaging device 22. This collected imaging information is processed by the steering control device 28 and used to steer the vehicle 10 accordingly using the steering control device 28, as will be seen.

Figure 7:
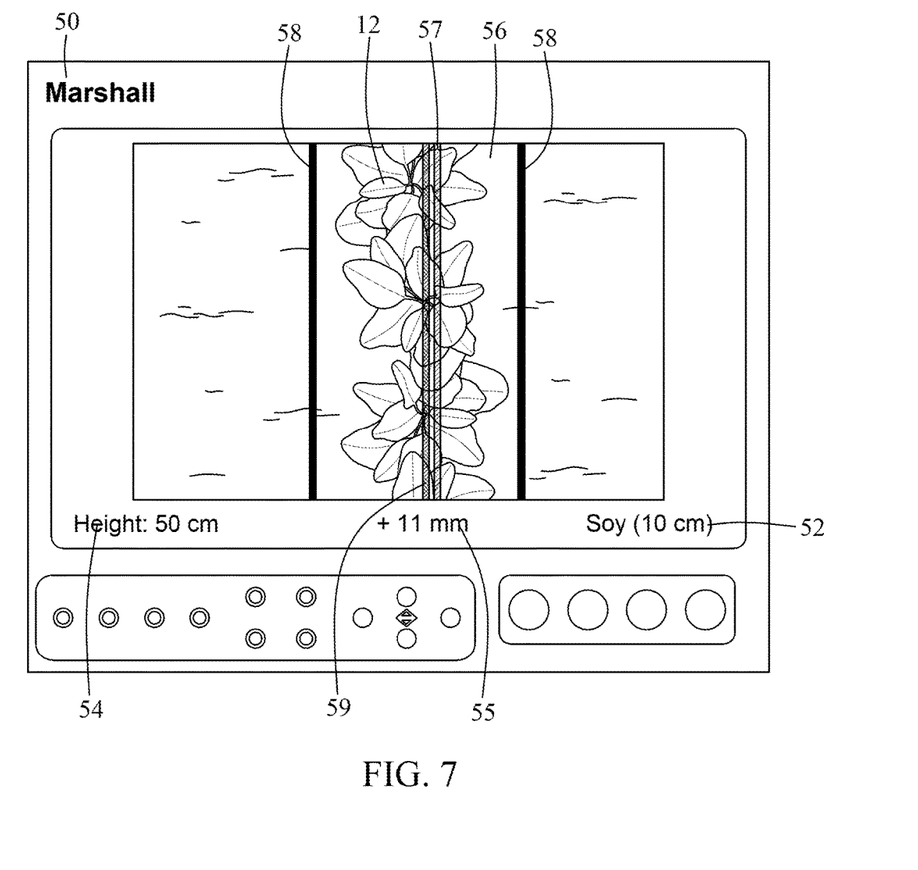
FIG. 7 is a screenshot of visual information of field characteristics generated by an agricultural vehicle guidance system, according to yet another embodiment of the present disclosure.

The optical imaging device 22 of the vehicle guidance system 20 may include a visual imaging device, such as a video camera, or other optical imaging devices such as an infra-red camera, a laser emitter/receptor, or the like. Regardless, the optical imaging device 22 is operable to collect data which correspond to information relating to the characteristics of the field (e.g. the row crop). Such information (data and/or images) of the field characteristics may include, but is not limited to, images of the segmentation of crops from weeds and the soil, stage of crop growth, and the lateral offset of the rows of crops. Other characteristics or features of the field in which the crop grows may also be included in the field characteristics information collected by the optical imaging device 22. This information on field characteristics is collected using the optical imaging device 22, which in one particularly embodiment may include a digital still and/or video camera. The video camera can for example include a CCD (Charge-Coupled Device) camera or a relatively low-cost RGB-NIR camera. The video camera of the optical imaging device 22 can be mounted to the vehicle 10 at any suitable location, depending on the field characteristics to measure, and may be pointed forward in the direction of travel 11 of the vehicle 10, and/or downwardly toward the ground. For example, if it is desired to collect information on field characteristics such as stage of crop growth or the lateral offset of the rows of crops, the video camera of the optical imaging device 22 can be mounted to the vehicle 10 and/or positioned relative thereto such as to be in line with a crop row, in order to obtain a video stream of the crops passing beneath the vehicle 10 as it is displaced along the direction of travel 11, as illustrated in FIG. 7 for example.

The video camera of the optical imaging device 22 therefore provides computer-based vision guidance to the vehicle guidance system 20 to assist farmers, for example during inter-row cultivation in the early stages of seedling growth. By taking a continuous video feed of the crops passing beneath the vehicle 10, the lateral offset of the crop row can be determined by segmenting the plants from the soil using a dynamic band-pass HSV filter. The location of the row can then be estimated based on the statistical distribution of plants in the direction of travel 11.

The optical imaging device 22 is therefore in electrical communication with the steering control device 28, for example by direct hard-wired electrical communication or by wireless communication, via the transmitter 23 and the receiver 29. An output signal is generated by the transmitter 23 of the optical imaging device 22 and received by the receiver 29 of the steering control device 28 to control the steering of the vehicle 10. One or both of the optical imaging device 22 and the steering control device 28 includes a control system 26 including at least a memory, a processor, and a transceiver (receiving/transmitting unit) which individually and/or in combination are operable to store, process, transmit/receive the information of the field characteristics, and/or generate an output signal to a steering actuator 30, as will be described. Computer analysis by the control system 26 of video streams allows for a viable method of obtaining guidance information, and with the same equipment, also allows sensing a variety of different guiding features with minor user-level software changes.

Referring back to FIG. 2, the steering control device 28 of the vehicle guidance system 20 is detachably mountable to the steering wheel 13 of the vehicle 10 to control the direction of the vehicle 10, using the information on field characteristics collected by the optical imaging device 22 and transmitted to the steering control device 28. More particularly, the steering control unit 28 includes a steering actuator 30 having a hub-coupling adapter 32 that is detachably coupled to the central hub 15 of the steering wheel 13 of the vehicle 10, such that relative rotation between the hub-coupling adapter 32 and the steering wheel 13 are prevent when the hub-coupling adapter 32 is mounted and coupled to the central hub 15 of the steering wheel.

It is of note that the steering systems of most agricultural vehicles 10 include a steering wheel 13, located within a cabin 14 of the vehicle 10 where the human operator sits, which has a central hub 15 and a number of spokes 16 which extend radially away from the central hub 15 towards an outer rim 17 of the steering wheel 13. The steering wheel 13 is mounted to a steering column 18 extending towards the bottom of the cabin 14. All the components of the steering wheel 13 generally rotate about a single steering wheel axis 19 which extends along and is typically co-axial with, and parallel to, the steering column 18. While other configurations for the steering of the vehicle 10 are possible, most configurations of steering systems for agricultural vehicles, unlike most road vehicles (cars, trucks, etc.) will include a relative basic steering wheel 13 having a central hub 15 rotating about a steering wheel axis 19.

Consequently, the hub-coupling adapter 32 of the steering actuator 30 can be detachably engaged (or "coupled") with the central hub 15 of the steering wheel. In order to permit the hub-coupling adapter 32 of the steering actuator 30 to be quickly and easily mounted to the central hub 15 of the steering wheel 13 by the operator, it is to be understood that the hub-coupling adapter 32 is sized and shaped to simply fit overtop of the central hub 15, with the "fingers" 37 of the hub-coupling adapter 32 being received between each of the spokes 16 of the steering wheel 13. When so coupled, the torque generated by the motor 34 to rotate the hub-coupling adapter 32 of the steering actuator 30 will be transmitted direct to, cause a corresponding rotation of, the steering wheel 13 of the vehicle 10. However, no fasteners or other more permanent fixation mechanisms are required to secure the hub adapter 32 to the steering wheel 13.

The hub adapter 32 and the motor 34 are coaxially engaged to define therethrough a common axis (i.e. they are coaxially mounted) that forms an axis of rotation 21 of the hub adapter 32 when driven by the motor 34. Therefore, when the hub adaptor 32 is mounted to the central hub 15 of the steering wheel 13 of the agricultural vehicle 10 in fixed rotary engagement, rotation of the hub adaptor 32 of the steering actuator 30 by the motor 34 about the axis of rotation 19 will cause corresponding rotation of the central hub 15 (and therefore the steering wheel 13) about the steering wheel axis 19 that is coaxial with the axis of rotation 21 of the motor and the hub adapter.

The hub-coupling adapter 32 of the steering actuator 30 in the steering control unit 28 can therefore be mounted to, and disengaged from, the central hub 15 of the steering wheel 13. When mounted to the central hub 15, the hub-coupling adapter 32 is operable to be rotated by the steering actuator 30. The steering actuator 30 of the steering control device 28 therefore controls the rotation of the steering wheel 13 about the steering wheel axis 19, thereby controlling the direction of travel 11 of the vehicle 10. The steering control device 28 operates based on information of the field characteristics received from the optical imaging device 22, thereby permitting the present vehicle guidance system 20 to autonomously or semi-autonomously control at least the direction of travel 11 of the vehicle 10.

Referring still to FIG. 2, the steering control device 28 also includes a support structure 40 to which the steering actuator 30 is mounted. The support structure 40 permits the steering control device 28 to be a self-supported unit such that it can be linked to an immobile object in the cabin 14 of the vehicle 10. More particularly, the support structure 40 may include an articulated arm 42, which may also adjustable and/or extendable, a first end 41 of which is detachably fastenable to the vehicle 10, for example to a window of the cabin 14 using suction cups 44 mounted to the first end 41. The opposed second end 43 of the arm 42 is mounted to the steering actuator 30. The arm 42 and its removable attachment at the first end 41 thereof to the vehicle 10 permit the steering actuator 30 (attached to the opposed second end 43 of the arm 42) to remain substantially stationary in space when the steering actuator 30 applies torque to the steering wheel 13 via the hub-coupling adapter 32 mounted to central hub 15. The information on field characteristics collected by the optical imaging device 22 and transmitted to the steering control device 28, is thus processed and used to actuate the steering actuator 30 appropriately to steer the vehicle 10 in the desired direction.

Still referring to FIG. 2, the hub-coupling adapter 32 (or simply "hub adapter" 32) of the steering actuator 30 is driven by the motor 34, which may for example be an electric motor such as a stepper motor. The hub adapter 32 is removably mounted to the central hub 15 of the steering wheel 13. The hub adapter 32 is shown as a cylindrical body, but may take other shapes as well. In one embodiment, it is a hollow object along some or all of its length which abuts the central hub 15 and/or the spokes 16. The motor 34 of the steering actuator 30 receives information of the field characteristics from the optical imaging device 22, via the control system 26. In response to the information on field characteristics, the control system 26 actuates the motor 34 provides the torque required to rotate the hub adapter 32 mounted to the central hub 15, and to thus rotate the steering wheel 13 to control the direction of travel 11 of the vehicle 10.

The engagement of the motor 34 with the hub adapter 32 may vary. In one embodiment, the motor 34 is located within the hub adapter 32, which is in turn mounted directly to the central hub 15 such that there is no slip between an outer surface of the central hub 15 and the motor 34. In such a configuration, a rotational output of the motor 34 will be directly transmitted to the central hub 15, causing it to rotate about the steering wheel axis 19.

In another embodiment, the motor 34 is positioned outside the hub adapter 32, as shown in FIG. 2. The motor 34 has a motor output shaft 36 which is attached to an upper end of the hub adapter 32 in a fixed rotational relationship, such that the motor output shaft 36 and the hub adapter 32 rotate together. In such a configuration, the torque generated by the motor 34 and outputted via the motor output shaft 36 will cause the hub adapter 32, and thus the central hub 15 to which the hub adapter 32 is mounted, to rotate.

It can thus be appreciated that the motor 34 engages, directly or indirectly, the hub adapter 32 which is in turn adapted to be detachably coupled to the central hub 15 of the steering wheel 13, to thereby autonomously rotate the steering wheel 13 clockwise or counter clockwise based on the information of field characteristics processed by the control system 26. The steering control device 28 of the vehicle guidance system 20 therefore autonomously or semi-autonomously controls the steering of the vehicle 10 based on the detected field characteristics. Since the steering actuator 30 is mounted to a center of the steering wheel 13 (i.e. it central hub 15) rather than to the steering column 18 or rim 17, the steering actuator 30 and/or support structure 40 are relatively quick and easy to install. It has been observed that the steering actuator 30 and/or support structure 40 can be installed onto the central hub 15 of the steering wheel 13 in under ten minutes, and in some cases, under five minutes. In further contrast to some conventional guidance mechanisms, the steering actuator 30 does not require that components of the steering wheel 13 be disassembled prior to mounting. In further contrast to some other guidance mechanisms mounted to the steering wheel 13 or steering column 18, the steering actuator 30 does not require a relatively complex gearing arrangement to rotate the steering wheel 13.

By mounting the steering actuator 30 to the central hub 15, rather than to the outer rim 17 for example, it may be easier to prevent slippage between the steering wheel 13 and the steering actuator 30. Furthermore, the steering actuator 30 may be better able to control the rotation of the steering wheel 13 from its central hub 15 compared to other guidance mechanisms mounted elsewhere on the steering wheel 13. The central mounting of the motor 24 also allows the motor 34 to better sense the position of the steering wheel 13, which helps to simplify the guidance algorithm.

The motor 34 can be any suitable motor 34 suitable for such an application. One possible suitable motor 34 includes a stepper motor providing incremental rotational outputs. These incremental rotational outputs have a high sensitivity, thereby providing a high degree of control when rotating the central hub 15, and ultimately, the steering wheel 13.

In operation, computer-vision guidance is provided to the motor 34 of the steering actuator 30 by the optical imaging device 22, which in turn rotates the hub adapter 32 (and thus the central hub 15 of the steering wheel 13) accordingly to steer the vehicle 10 based on the collected information of field characteristics detected around the agricultural vehicle. In one embodiment, the processor of the control system 26 runs an algorithm which analyses the visual feed data to, for example, segment the crops from the soil and weeds, and identify the lateral offset of the rows of crops. The control system 26 then outputs this information to the motor 34 of the steering actuator 30. Upon receiving information about a deviation in the lateral offset of the rows of crops, for example, the motor 34 may react by rotating the central hub 15 of the steering wheel 13 clockwise or counter clockwise a calculated angular amount required to appropriately correct the course of the vehicle 10. The rotation of the steering wheel 13 will correct the direction of the vehicle 10 until the lateral offset of the rows of crops are within the accepted range.

In some embodiments, the steering control device 28 can be controlled with an add-on external controller, such as a cell phone. This can help to steer the vehicle 10 using a GNSS receiver and third-party guidance control software, including a potential mobile phone application. This option can add system versatility in addition to the targeted application of row crops.

Figure 3:
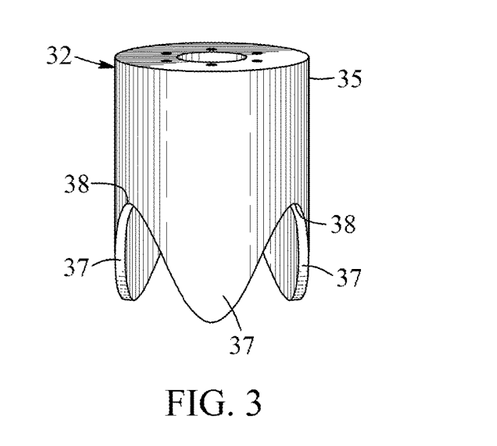
FIG. 3 is a perspective view of a hub adapter of a steering unit of the agricultural vehicle guidance system of FIG. 2.
Figure 4:
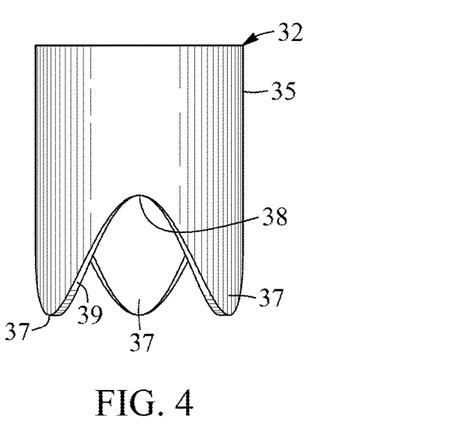
FIG. 4 is a side view of the hub adapter of FIG. 3.

Referring now to FIGS. 3 and 4, the hub adapter 32 of the steering actuator 30 may have a generally cylindrical body with a base 35 at a first end and a plurality of steering wheel spoke-engaging elements 37, which in this embodiment comprise projecting "fingers" 37, at the second opposed end of the body. These projections 37 are disposed circumferentially about the body of the hub adapter 32, and circumscribe a central opening in the second end of the body which is adapted to receive therein at least a portion of the central hub 15 of the steering wheel 13. Accordingly, the cylindrical body of the hub adapter 32 is shaped and configured to fit overtop of the central hub 15 of the steering wheel 13, with the fingers 37 extending between each of the spokes of the steering wheel 13. It will be appreciated that the spoke-engaging elements, projections, and fingers may be the same object, and are thus referred to herein by reference number 37.

In the embodiment shown in FIGS. 3 and 4, the second end of the body may include fingers 37 and resting sections 38. Each finger 37 is a curved extension which extends downward away from the base 35 of the hub adapter 32, toward the steering column and between adjacent spokes of the steering wheel. Each finger 37 is wider at its base portion (i.e. the portion closer to the central hub) and narrows towards its lower extremity, thereby forming a substantially triangular shape. The base of each finger 37 extends between, and abuts against, adjacent spokes. When the hub adapter 32 is rotated by the motor, each of the fingers 37 engages the spokes near the central hub and causes the steering wheel to rotate.

Each resting section 38 is a curved section of the hub adapter 32 which extends between adjacent fingers 37. The bottom of each resting section 38 can be curved or shaped to match an upper surface of the spokes so that the hub adapter 32 can be placed upon the spokes about the central hub by abutting each resting section 38 against a corresponding spoke. The engagement of the fingers 37 and the resting sections 38 with the spokes allows for the hub adapter 32 to better apply torque to the central hub of the steering wheel. The fingers 37 and resting section 38 may therefore form a curved, or sinusoidal-like lower edge 39 at the end of the hub adapter 32 opposite to the portion of the hub adapter 32 engaged to the output of the motor 34. Other shapes and profiles for the fingers 37 and resting sections 38 are also within the scope of the present disclosure.

Figure 4A:
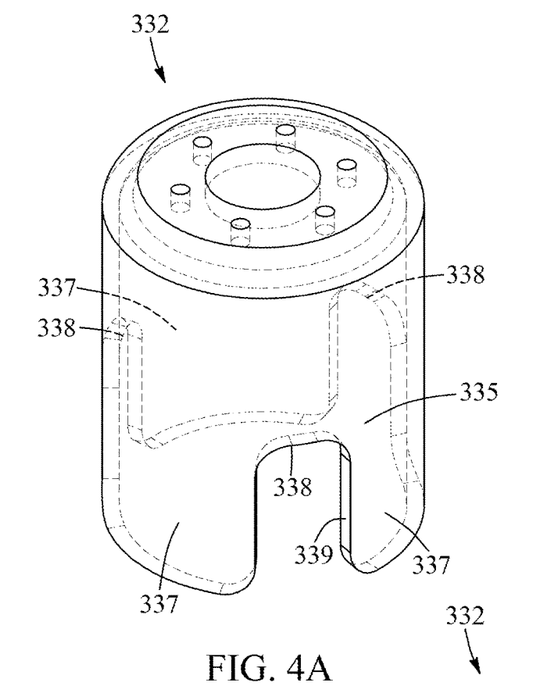
FIG. 4A is a perspective view of a hub adapter of a steering unit for an agricultural vehicle, according to another embodiment of the present disclosure.
Figure 4B:
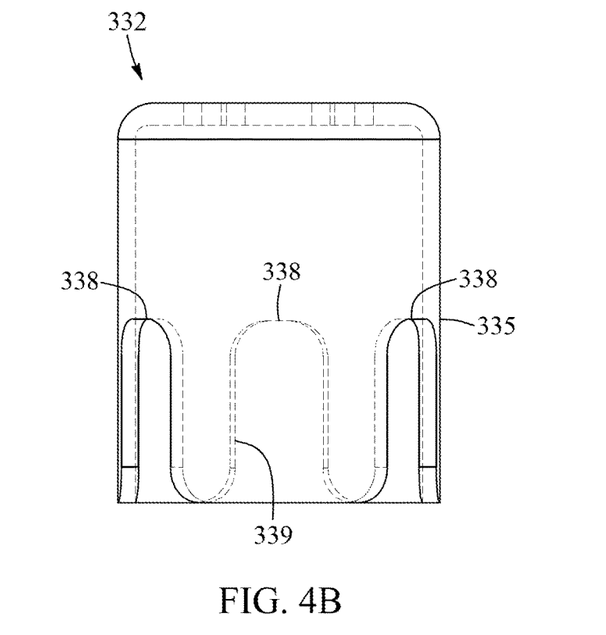
FIG. 4B is a side elevational view of the hub adapter of FIG. 4A.

FIGS. 4A and 4B show another embodiment of the hub adapter 332. Each finger 337 is an extension which extends downward away from the base 335 of the hub adapter 332, toward the steering column and between adjacent spokes of the steering wheel. The width of each finger 337 is substantially the same at its base portion (i.e. the portion closer to the central hub) and at its lower extremity. The base of each finger 337 extends between, and abuts against, adjacent spokes. When the hub adapter 332 is rotated by the motor, each of the fingers 337 engages the spokes near the central hub and causes the steering wheel to rotate. Each resting section 338 is a substantially flat section of the hub adapter 332 which extends between adjacent fingers 337. The hub adapter 332 can be placed upon the spokes about the central hub by abutting each resting section 338 against a corresponding spoke. The engagement of the fingers 337 and the resting sections 338 with the spokes allows for the hub adapter 332 to better apply torque to the central hub of the steering wheel. The fingers 337 and resting section 338 may therefore form a substantially planar lower edge 339 at the end of the hub adapter 332 opposite to the portion of the hub adapter 332 engaged to the output of the motor.

Figure 5:
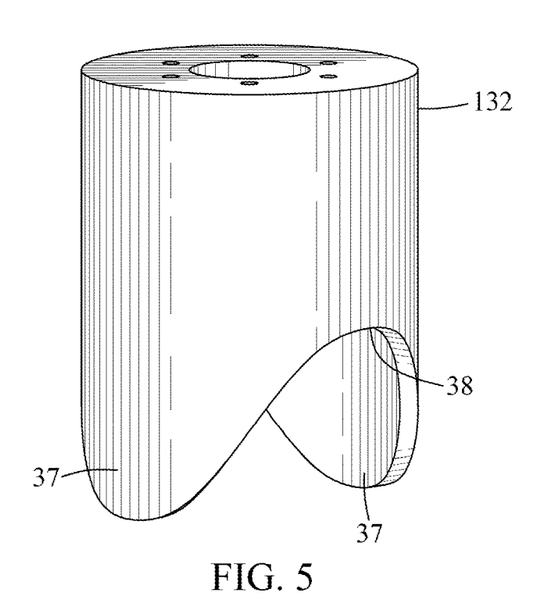
FIG. 5 is a perspective view of a hub adapter of a steering unit for an agricultural vehicle, according to yet another embodiment of the present disclosure.
Figure 6:
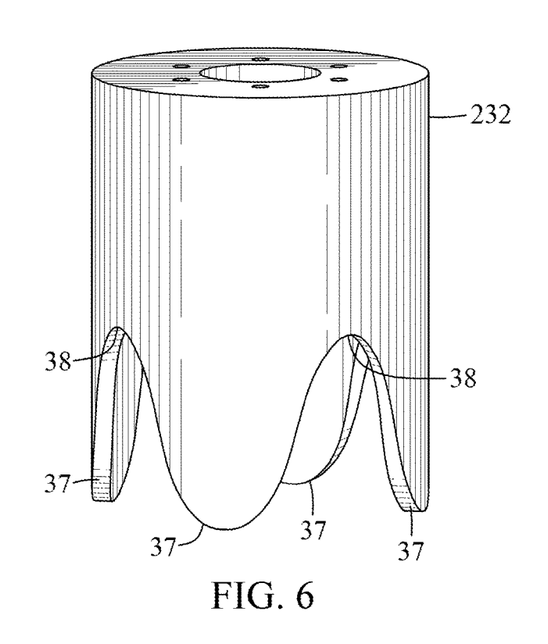
FIG. 6 is a perspective view of another hub adapter of a steering unit for an agricultural vehicle, according to yet another embodiment of the present disclosure.

FIGS. 3 and 4 show a three-finger 37, three-resting-section 38 configuration, and it will be appreciated that other configurations of the fingers 37 and the resting sections 38 are within the scope of the present disclosure. Indeed, FIG. 5 shows another configuration of fingers 37 and resting sections 38. The hub adapter 132 of FIG. 5 has two fingers 37 and two resting sections 38, which may be suitable for use on a steering wheel with only two spokes. The hub adapter 232 of FIG. 6 has four fingers 37 and four resting sections 38, which may be suitable for use on a steering wheel with four spokes. It will be appreciated that a hub adapter 32 having any number of fingers 37 and resting sections 38, and any combination of fingers 37 and resting sections 38, is within the scope of the present disclosure.

There is also disclosed a method for guiding the agricultural vehicle. The method includes obtaining visual information in the form a digitized image of field characteristics in the direction of travel of the vehicle. The method also includes rotating the central hub of the steering wheel in response to the visual information of field characteristics, in order to steer the vehicle along the direction of travel.

FIG. 7 is an example of a screen shot of a display unit 50 which can be placed in the cabin of the vehicle for the benefit of the human operator, irrespective of whether the vehicle is steered autonomously, semi-autonomously, or by the human operator. The visual information gathered by the video camera is processed and outputted to the display unit 50. The human operator can therefore see one or more of the field characteristics, such as the row of crop 52. The row of crop 52 is indicated on the display unit 50 as being "soy". The human operator can also observe on the display unit 50 the position 54 (i.e. height) of the video camera from the ground.

The human operator can also observe on the display unit 50 another one of the field characteristics, such as the lateral offset range 56 of each row of crops 12. The white vehicle travel line 57 shows the position of the vehicle in real time versus the leftmost and rightmost extremities 58 (the dark lines) of the lateral offset range 56. If the vehicle travel line 57 veers towards or is to the left/right of the dark lines of the leftmost and rightmost extremities 58, a course correction may be required to return the vehicle to within the accepted lateral offset range 56. The gray center line 59 represents the ideal position of the vehicle within the lateral offset range 56, and is the midpoint between the leftmost and rightmost extremities 58. The display unit 50 can show the deviation 55 from the center line in real time, by measuring the lateral distance between the vehicle travel line 57 and center line 59. FIG. 7 shows the deviation 55 to be about 11 mm for the period of time captured in this particular screen shot.

It can thus be appreciated that the guidance system 20 disclosed herein is a computer-vision control system which is capable of semi-autonomous vehicle guidance during early-to-mid season field operations on row crops. Indeed, the guidance system 20 can be used in the field for various travel speeds in corn and soybean fields under varying ambient light and crop conditions.

The guidance system 20 provides an economic, entry-level optical control for an agricultural vehicle that can be installed within minutes on almost any tractor or other agricultural vehicle equipped with power-assisted steering. Such a quick-install guidance system 20 relying on computer vision provides a way of reducing human operator fatigue and limiting damage to row crop seedlings, and is an inexpensive way of guiding agricultural tractors at an affordable cost using computer vision without the need for expensive LIDAR or GPS systems.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A vehicle guidance system for an agricultural vehicle, comprising:
    an optical imaging device adapted to be mounted to the agricultural vehicle, the optical imaging device collecting information of field characteristics; and
    a steering control device in electrical communication with the optical imaging device and receiving the information of field characteristics transmitted from the optical imaging device, the steering control device having a steering actuator including a motor operatively connected to a hub adaptor, the hub adapter and the motor being coaxially engaged to define therethrough a common axis forming an axis of rotation of the hub adapter when driven by the motor, the hub adaptor being removably mountable to a central hub of a steering wheel of the agricultural vehicle in fixed rotary engagement, wherein when the hub adaptor is engaged to the central hub of the steering wheel, rotation of the hub adaptor by the motor about said axis of rotation causes corresponding rotation of the steering wheel about a steering wheel axis that is coaxial with the axis of rotation of the motor and the hub adapter, the steering control device thereby autonomously rotating the central hub of the steering wheel in response to the information of field characteristics received by the steering control device from the optical imaging device, the vehicle guidance system thereby steering the agricultural vehicle.

2. The vehicle guidance system of claim 1, further comprising a support structure of the steering control device, the support structure having a first portion adapted to be fixed to an immobile objection of the vehicle, and a second portion to which the steering actuator is mounted.

3. The vehicle guidance system of claim 2, wherein the support structure includes an articulated arm, the articulated arm having a first end thereof forming the first portion and being detachably fastenable to the vehicle and a second end opposed to the first end and having the steering actuator mounted thereto.

4. The vehicle guidance system of claim 3, wherein the first end of the articulated arm includes one or more suction cups adapted to be engaged to a window of the vehicle.

5. The vehicle guidance system of claim 3, wherein the articulated arm is adjustable and/or extendable.

6. The vehicle guidance system of claim 1, wherein the hub adapter of the steering actuator includes a plurality of fingers extending in a direction of the axis of ration and resting sections defined circumferentially between the fingers, each finger extending axially from an end of the hub adapter engaged with the motor of the steering control device and being circumferentially spaced apart from an adjacent finger of the hub adapter by one of the resting portions, wherein when the hub adapter is mounted to the central hub of the steering wheel, each of the fingers extend between adjacent spokes of the steering wheel and each resting section is seated on one of the spokes.

7. The vehicle guidance system of claim 1, wherein the optical imaging device and the steering control device are in direct hard-wired electrical communication with each other.

8. The vehicle guidance system of claim 1, wherein the optical imaging device includes a transmitter and the steering control device includes at least a receiver in communication with each other, the optical imaging device and the steering control device being wireless communication with each other.

9. The vehicle guidance system of claim 8, wherein the steering control device includes a transceiver in two-way communication with the optical imaging device.

10. The vehicle guidance system of claim 1, wherein one or both of the optical imaging device and the steering control device includes a control system including at least a memory, a processor, and a transceiver (receiving/transmitting unit) which individually and/or in combination are operable to store, process, transmit/receive the information of the field characteristics, and/or generate an output signal to the steering actuator.

11. The vehicle guidance system of claim 10, wherein the control system is operable to conduct computer-vision analysis of the information of field characteristics collected by the optical imaging device.

12. The vehicle guidance system of claim 11, wherein the processor of the control system runs an algorithm which analyses visual data of the information of field characteristics produced by the optical imaging device, to at least one of segment the crops from the soil and weeds and identify the lateral offset of the rows of crops.

13. The vehicle guidance system of claim 12, wherein upon receiving information of a deviation in the lateral offset of the rows of crops, the control system actuates the motor to rotate the hub adapter and thus the central hub of the steering wheel a calculated angular amount to appropriate correct the course of the vehicle until the determined lateral offset of the rows of crops are within an accepted range.

14. The vehicle guidance system of claim 1, wherein the motor is integrally disposed within the hub adapter.

15. The vehicle guidance system of claim 1, wherein the steering control device is controlled by an external controller in wireless communication therewith.

16. The vehicle guidance system of claim 15, wherein the external control includes a smart phone or mobile device.

17. A steering control device for a vehicle guidance system of an agricultural vehicle, the steering control device comprising a steering actuator including a motor operatively connected to a hub adaptor, the hub adapter rotated by the motor about an axis of rotation and the hub adapter being removably mountable to a central hub of a steering wheel of the agricultural vehicle with the axis of rotation coaxial with a steering wheel axis of the steering wheel, the hub adapter having a generally cylindrical body with a base at a first end rotatably fixed to an output shaft of the motor and a number of spoke-engaging elements at an opposed second end of the hub adapter, the spoke-engaging elements being circumferentially spaced apart about the body of the hub adapter and circumscribing a central opening in the second end of the body which is adapted to receive therein at least a portion of the central hub of the steering wheel.

18. The steering control device of claim 17, wherein the spoke-engaging elements of the hub adapter include projecting fingers circumferentially spaced apart by resting sections, each of the fingers projecting away from the base of the body of the hub adapter a distance greater than the resting sections, such that the fingers are adapted to extend between adjacent spokes of the steering wheel.

19. The steering control device of claim 18, wherein the fingers are wider at a base portion thereof closest to the first end of the body and narrow towards the second end, thereby forming a substantially triangular shape.

20. The steering control device of claim 18, wherein the fingers form a curved extension which extends downward away from the base of the hub adapter, the second end of the body of the hub adapter defining a sinusoidal-like lower edge formed by the alternating curved fingers and resting sections.

21. The steering control device of claim 17, further comprising a support structure having a first portion adapted to be fixed to an immobile objection of the agricultural vehicle, and a second portion to which the steering actuator is mounted.

22. The steering control device of claim 21, wherein the support structure includes an articulated arm, the articulated arm having a first end thereof forming the first portion and being detachably fastenable to the agricultural vehicle and a second end opposed to the first end and having the steering actuator mounted thereto.

23. The steering control device of claim 22, wherein the first end of the articulated arm includes one or more suction cups adapted to be engaged to a window of the agricultural vehicle.

24. The steering control device of claim 22, wherein the articulated arm is adjustable and/or extendable.

25. The steering control device of claim 17, wherein the steering control device includes a control system having at least a memory, a processor, and a transceiver (receiving/transmitting unit) which individually and/or in combination are operable to store, process, transmit/receive information of field characteristics, and to generate an output signal to the motor of the steering actuator.

26. The steering control device of claim 25, wherein the control system is operable to conduct computer-vision analysis of the information of said field characteristics collected by an optical imaging device in communication with the steering control device.

27. The steering control device of claim 26, wherein the processor of the control system runs an algorithm which analyses visual data of the information of said field characteristics produced by the optical imaging device, to at least one of segment the crops from the soil and weeds and identify the lateral offset of the rows of crops.

28. The steering control device of claim 27, wherein upon receiving information of a deviation in the lateral offset of the rows of crops, the control system actuates the motor of the steering actuator to rotate the hub adapter and thus the central hub of the steering wheel a calculated angular amount to appropriately correct the course of the agricultural vehicle until the determined lateral offset of the rows of crops are within an accepted range.

29. A method for guiding an agricultural vehicle, comprising:
 obtaining visual information of field characteristics in a direction of travel of the agricultural vehicle; and
 providing the visual information of field characteristics to a steering unit having an actuator mounted directly to the central hub of a steering wheel of the agricultural vehicle; and
 using the actuator to rotate the central hub, and therefore the steering wheel, in response to the visual information of field characteristics, thereby steering the agricultural vehicle along the direction of travel.

* * * * *